United States Patent
Seok (10) Patent No.: US 7,589,301 B2
(45) Date of Patent: Sep. 15, 2009

(54) INDUCTION HEATING DEVICE HAVING PLURAL RESONANT CIRCUITS

(75) Inventor: Kyoung Wook Seok, Seoul (KR)

(73) Assignee: IXYS Corporation, Santa Clara, CA (US)

(*) Notice: Subject to any disclaimer, the term of this patent is extended or adjusted under 35 U.S.C. 154(b) by 0 days.

(21) Appl. No.: 11/734,930

(22) Filed: Apr. 13, 2007

(65) Prior Publication Data

US 2007/0241101 A1    Oct. 18, 2007

Related U.S. Application Data

(60) Provisional application No. 60/792,154, filed on Apr. 14, 2006.

(51) Int. Cl.
*H05B 6/06* (2006.01)
*H05B 6/10* (2006.01)
*H05B 6/44* (2006.01)

(52) U.S. Cl. .................. 219/624; 219/626; 219/661; 219/662; 363/21.01

(58) Field of Classification Search ......... 219/620–627, 219/661–668; 363/21.01, 97
See application file for complete search history.

(56) References Cited

U.S. PATENT DOCUMENTS

| | | | | |
|---|---|---|---|---|
| 3,781,503 A | * | 12/1973 | Harnden et al. | 219/622 |
| 3,887,781 A | * | 6/1975 | Peter, Jr. | 219/627 |
| 4,112,287 A | * | 9/1978 | Oates et al. | 219/626 |
| 6,590,190 B1 | * | 7/2003 | Simeray | 219/626 |
| 2004/0222839 A1 | * | 11/2004 | Scollo et al. | 327/478 |
| 2005/0127065 A1 | * | 6/2005 | de Rooij et al. | 219/624 |
| 2005/0263521 A1 | * | 12/2005 | Kinouchi et al. | 219/626 |

FOREIGN PATENT DOCUMENTS

| | | | | |
|---|---|---|---|---|
| DE | 205781 A | * | 1/1984 | |
| JP | 02114488 A | * | 4/1990 | |
| JP | 5-226069 | * | 9/1993 | |
| JP | 6-29082 | * | 2/1994 | |

* cited by examiner

*Primary Examiner*—Joseph M Pelham
(74) *Attorney, Agent, or Firm*—Townsend and Townsend and Crew LLP

(57) ABSTRACT

A heating circuit includes a first heating coil provided adjacent to an object to be heated. A first capacitor is provided in parallel to the first heating coil, the first capacitor being a resonant component. An inductor is coupled to the first heating coil and the first capacitor.

14 Claims, 9 Drawing Sheets

INDUCTION HEATING DEVICE HAVING PLURAL RESONANT CIRCUITS

CROSS-REFERENCES TO RELATED APPLICATIONS

The present invention claims benefits of U.S. Provisional Application No. 60/792,154, filed on Apr. 14, 2006, which is incorporated by reference.

The induction heating circuit may be used in many electronics devices. One of its use is in an induction heating cooker, e.g., a rice cooker. The rice cooker has a housing enclosing a metal bowl, a heating coil, and a ceramic provided between the heating coil and the metal bowl.

Figure 1:
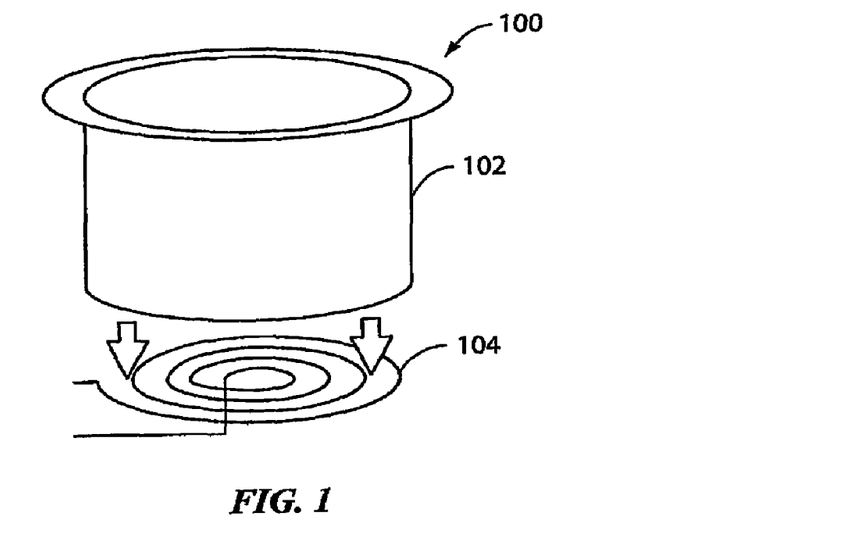
FIG. 1 shows an induction heating cooker that has a metal bowl and a heating coil that together define a transformer.
Figure 2:
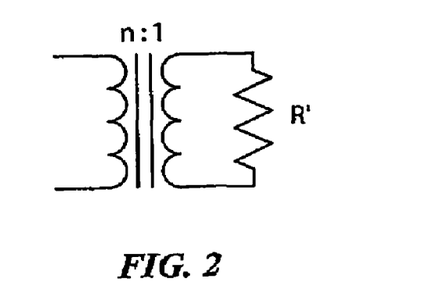
FIG. 2 illustrates a simple equivalent circuit of the heating coil and the metal bowl as a transformer.

FIG. 1 shows an induction heating cooker 100 that has a metal bowl 102 and a heating coil 104 that together define a transformer. The turns ratio is n:1, where n is the number of coil turns. FIG. 2 illustrates a simple equivalent circuit of the heating coil and the metal bowl as a transformer, where R' is the resistance of the metal bowl. The heating coil is on the primary side, and the metal bowl is on the secondary side of the transformer. A power circuit applies AC voltage across the coil. The AC voltage is transferred to the secondary side, i.e., to the metal bowl. The AC voltage applied to the secondary side is reduced by 1/n. High current flows through the metal bowl since it has low resistance. This current is reduced to 1/n at the primary side, which is the coil.

There are several methods of applying AC voltage to the primary side of the transformer, i.e., the heating coil. The circuit is generally comprised of switching semiconductor devices (transistors or switch), capacitor, and inductors. The semiconductor devices are operated in a switch mode, not in a linear mode.

Figure 3:
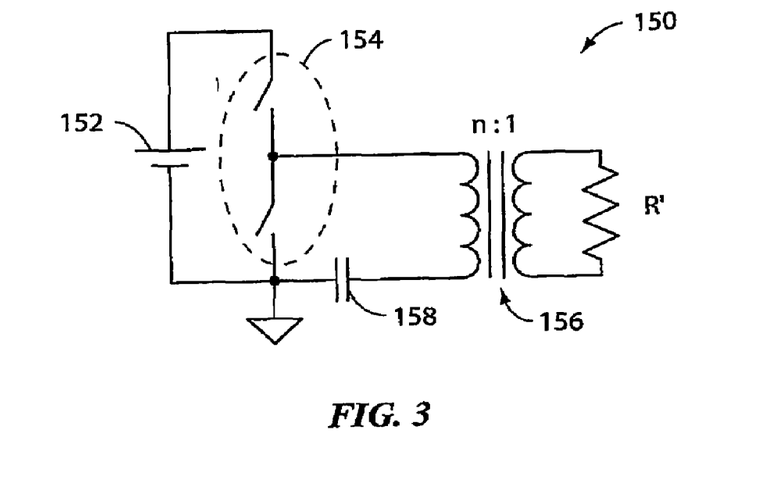
FIG. 3 illustrates a half-bridge type circuit that could be used as the heating circuit.

FIG. 3 illustrates a half-bridge type circuit 150 that could be used as the heating circuit. The circuit 150 includes a voltage source 152, transistors 154 in a half bridge configuration, a transformer 156, and a blocking capacitor 158 to block DC currents. A resistor R' represents the resistance of the secondary side, i.e., metal bowl, of the transformer 156. Since the voltage applied on the switching device does not exceed the DC link voltage by much, the device having low breakdown voltage can be used. The output voltage is symmetrical upon voltage polarity. One disadvantage of the half-bridge type circuit is that it requires two transistors and a complicated driver circuit for controlling the high side switching device. Since the output voltage is small, the required number of turns of coil is small and the primary current is large.

Figure 4:
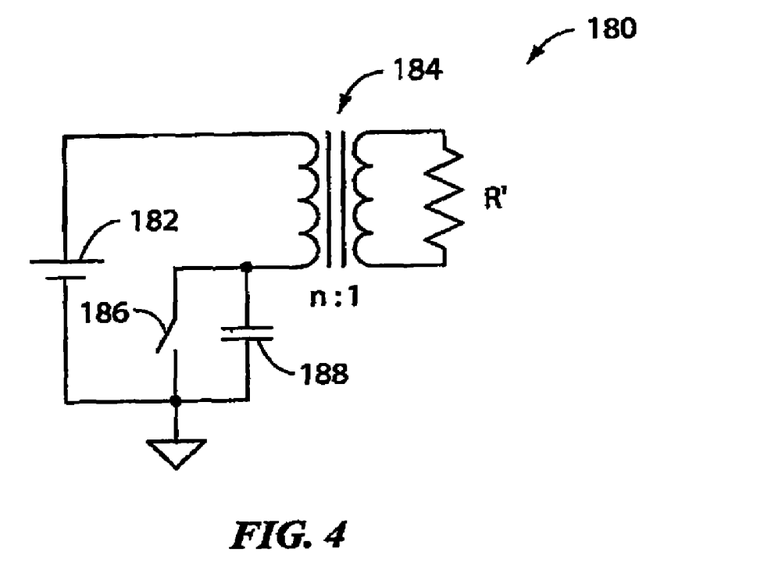
FIG. 4 illustrates a class-E converter type circuit as an induction heating circuit.

FIG. 4 illustrates a class-E converter type circuit 180 as an induction heating circuit. The circuit 180 includes a voltage source 182, a transformer 184, a transistor 186, and a capacitor 188 that is in parallel to the transistor 186. The circuit 180 uses one transistor so the manufacturing cost is lower. The output voltage is substantially fixed and larger than that of the half bridge type circuit. The transistor 186 sees much larger voltage than the DC link voltage. The transistor 186 needs have a high breakdown voltage.

BRIEF SUMMARY OF THE INVENTION

In one embodiment, a heating circuit includes a first heating coil provided adjacent to an object to be heated. A first capacitor is provided in parallel to the first heating coil, the first capacitor being a resonant component. An inductor is coupled to the first heating coil and the first capacitor.

In one embodiment, a second heating coil is coupled to the first heating coil, the second heating coil including a heating coil provided around the conductive bowl. A switch is coupled to the inductor. A second capacitor is provided in parallel to the switch. The heating circuit is coupled to a sensor to detect if a current slope goes negative and a gate driver configured to output a control signal to turn on or off the switch.

In one embodiment, an induction heating circuit includes a first heating coil provided below a conductive bowl to heat the conductive bowl; a second heating coil provided around a body of the conductive bowl; and at least one capacitor defining a resonant loop with the first heating coil, the second heating coil, or both.

In one embodiment, the heating circuit includes first, second, and third nodes, wherein the first capacitor and the first heating coil are provided between the first and second nodes, wherein the second heating coil is provided between the second and third nodes. The heating circuit includes a second capacitor having an end connecting the first node and another end connecting the third node.

In one embodiment, the heating circuit includes first, second, third and fourth nodes, wherein the first heating coil is provided between the first and second nodes, and the second heating coil is provided between the second and third nodes. A first capacitor has one end connected to the first node and another end connected to the third node. A second capacitor has one end connected to the second node and another end connected to the fourth node. A switch is provided between the third node and the fourth node, the third node being between the second heating coil and the switch.

In one embodiment, the heating circuit includes first, second, third and fourth nodes. A first capacitor has one end connected to the second node that is provided between the first and second heating coils and another end connected to the fourth node. A second capacitor has one end connected to the third node and another end connected to the fourth node. A switch is provided between the third and fourth nodes.

DETAILED DESCRIPTION OF THE INVENTION

Figure 5A:
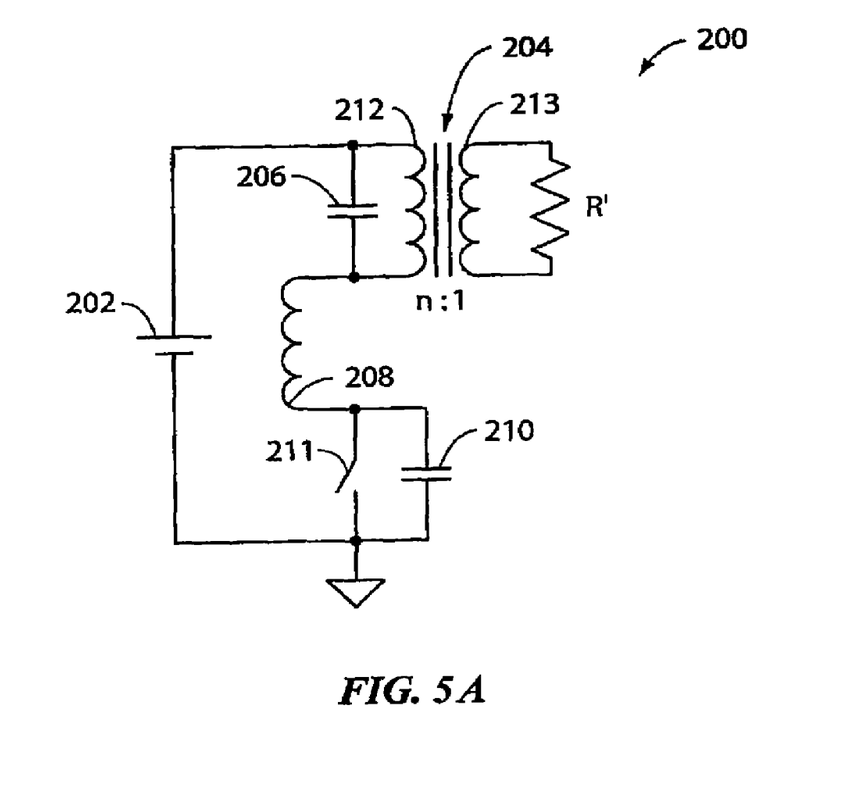
FIGS. 5A-5C illustrate induction heating circuits according to embodiments of the present invention.

The present invention relates to an induction heating circuit. FIG. 5A illustrates an induction heating circuit 200 according to one embodiment of the present invention. The heating circuit 200 relates to the class-E converter type circuit having one or more resonant components, e.g., a capacitor and inductor. These resonant components increase the power output and enables the circuit to be operated using a smaller current.

The heating circuit 200 includes a voltage source 202, a transformer (or heating coil) 204, a first capacitor 206 parallel to the transformer (or heating coil) 204, an inductor 208, a second capacitor 210, and a transistor 211. The second capacitor 210 is parallel to the transistor 211. The capacitors 206 and 210 are resonant components. The transformer (heating coil) 204 includes a first heating coil 212 on the primary side and a metal bowl 213 on the secondary side. The inductor 208 may be another heating coil. Herein the heating circuit of the present embodiments will be described primarily from the perspective of the primary side of the transformer, so the term "heating coil" will be used where possible instead of the term "transformer".

Figure 5B:
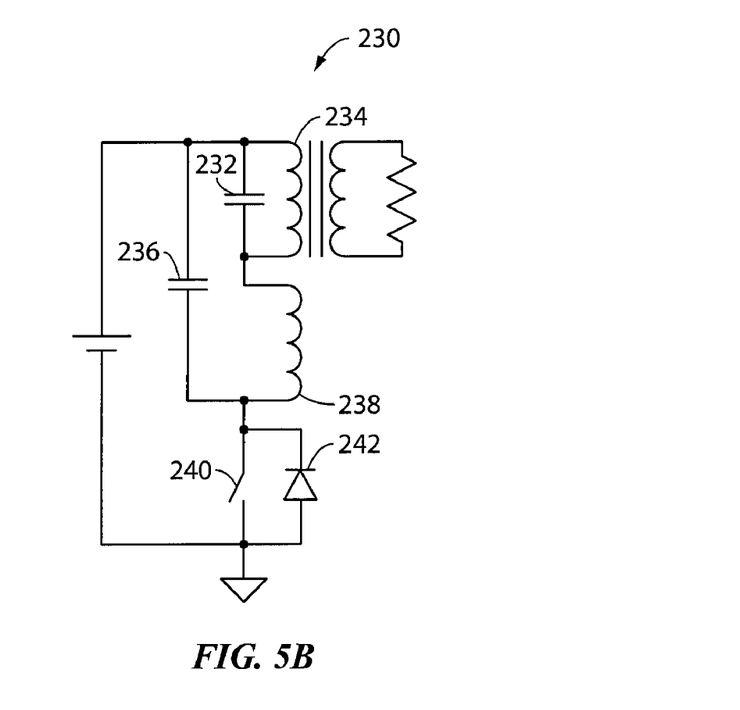

FIGS. 5B illustrates an induction heating circuit 230 according to one embodiment of the present invention. The circuit 230 has a first capacitor 232 parallel to the a heating coil 234 and a second capacitor 236 parallel to the union of an inductor 238 and the heating coil 234. The heating coil is part of a transformer. A switch 240 is connected to a node between the second capacitor 236 and the inductor 238. The switch may be an Insulated Gate Bipolar Transistor (IGBT) or Bipolar Junction Transistor (BJT). A diode 242 is connected anti-parallel to the switch 240. The first and second capacitors 232 and 236 are resonant capacitors. The above configuration enables capacitors with a lower voltage rating to be used as the first and second capacitors 232 and 236.

Figure 5C:
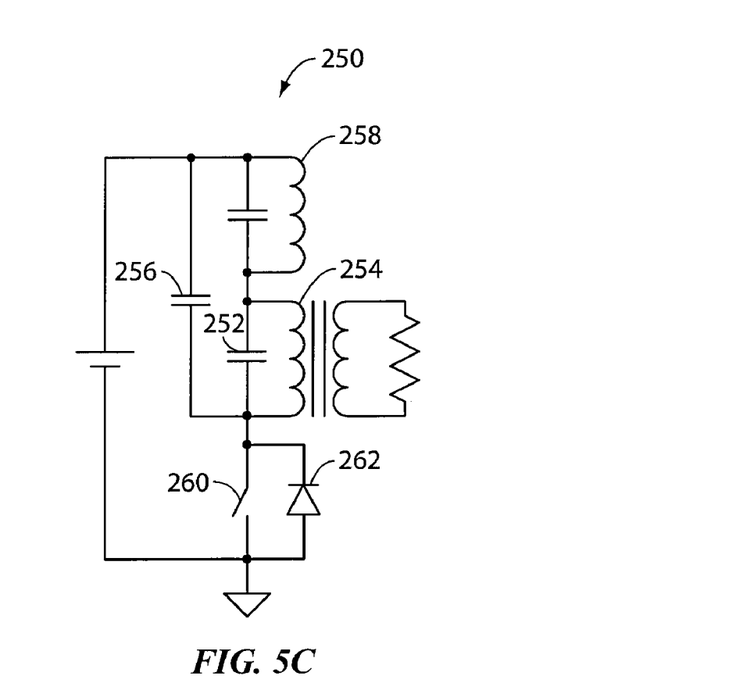

FIG. 5C illustrates an induction heating circuit 250 according to one embodiment of the present invention. The circuit 250 has a first capacitor 252 parallel to a heating coil 254 and a second capacitor 256 parallel to the union of an inductor 258 and the heating coil 254. The inductor 258 is provided above the heating coil 254, i.e., closer to the positive rail, in the present embodiment. A switch 260 is connected to a node common to the first capacitor 252, the second capacitor 256 and the heating coil 254. The switch may be an Insulated Gate Bipolar Transistor (IGBT) or Bipolar Junction Transistor (BJT). A diode 242 is connected anti-parallel to the switch 260. The first and second capacitors 232 and 236 are resonant capacitors.

Figure 6:
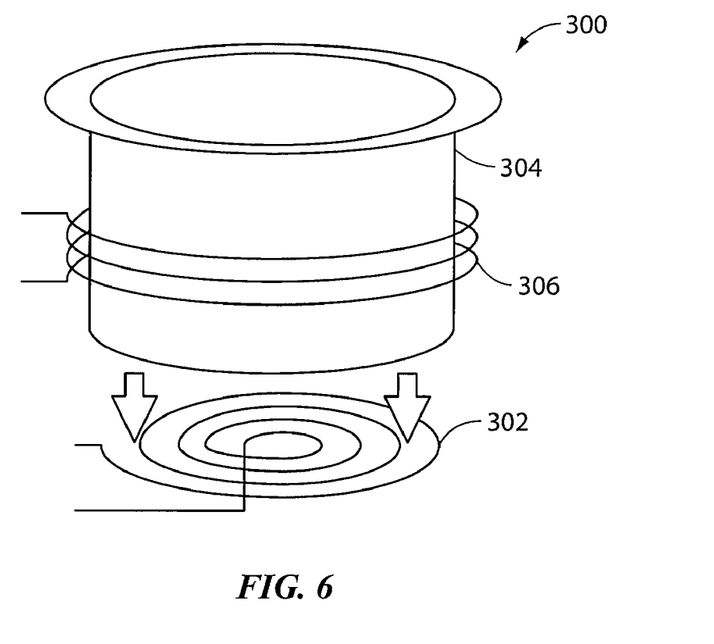
FIG. 6 illustrates partial view of a rice cooker having a first heating coil provided below a metal bowl and a second heating coil provided around the side of the metal bowl according to one embodiment of the present invention.

FIG. 6 illustrates partial view of a rice cooker 300 having a first heating coil 302 provided below a metal bowl 304 and a second heating coil 306 provided around the side of the metal bowl 304 according to one embodiment of the present invention.

Figure 7A:
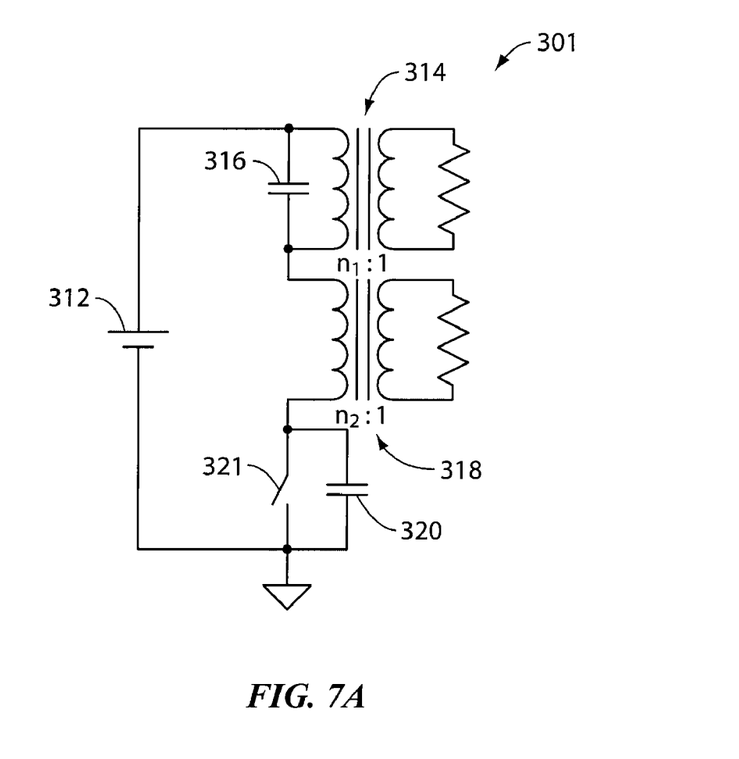
FIGS. 7A-7C illustrate equivalent circuits associated with the rice cooker of FIG. 6.

FIG. 7A illustrates an equivalent circuit 301 associated with the rice cooker 300 of FIG. 6. The circuit 301 includes a voltage source 312, a first transformer (or first heating coil) 314, a capacitor 316 parallel to the first heating coil 314, a second transformer (or second heating coil) 318, a capacitor 320, and a transistor 321. The capacitors 316, 320 are resonant components.

The second heating coil 318 is wrapped around the metal bowl 304 to more effectively use the energy consumed in the inductor, i.e., the heat generated by the parasitic resistance therein. The capacitor 320 is provided in parallel to the transistor 321. Alternatively, the first heating coil 314 may be a heating coil that is wrapped around the metal bowl and the second heating coil 318 may have a heating coil that is provided below the metal bowl.

Figure 7B:
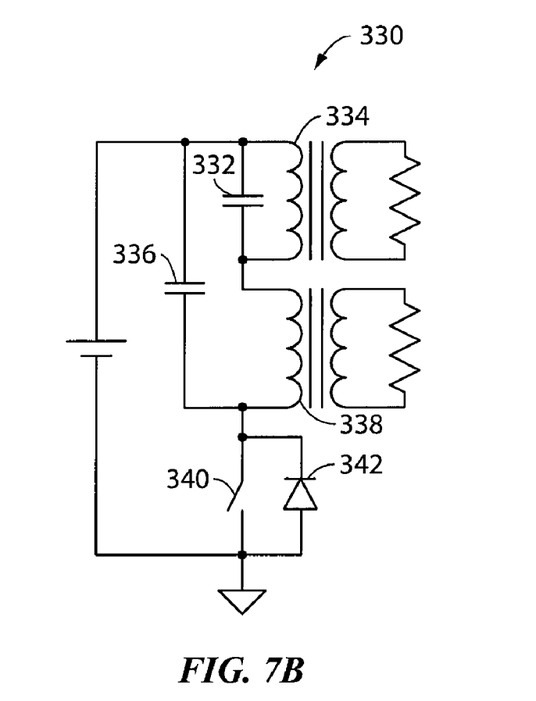

FIG. 7B illustrates another equivalent circuit 330 associated with the rice cooker 300 of FIG. 6. The circuit 330 has a first capacitor 332 parallel to a first heating coil 334 and a second capacitor 336 parallel to the union of the first and second heating coils 334 and 338. The capacitors and the heating coils are resonant components. A switch 340 is connected to a node between the second capacitor 336 and the second heating coil 338. A diode 342 is connected anti-parallel to the switch 340. The capacitors and the heating coils are resonant components defining resonant loops.

Figure 7C:
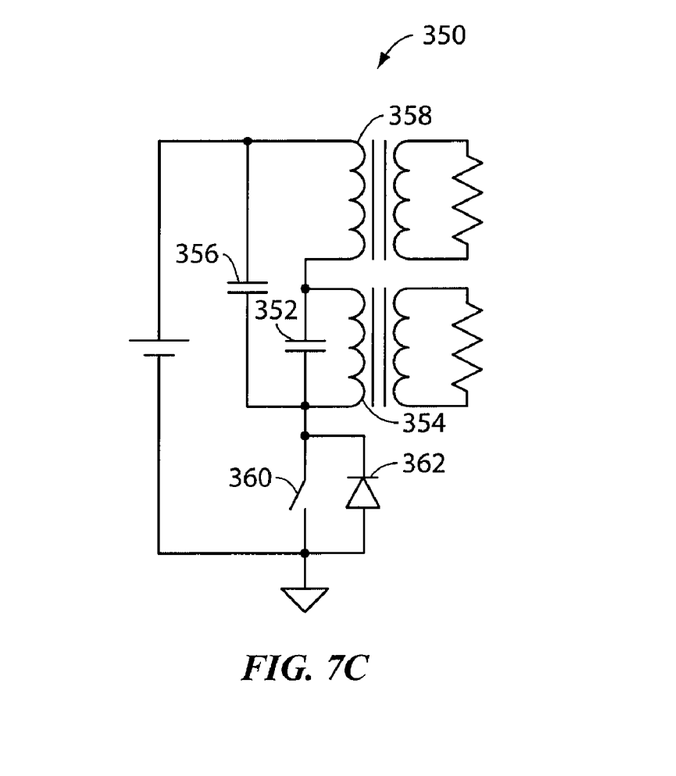

FIG. 7C illustrates another equivalent circuit 350 associated with the rice cooker 300 of FIG. 6. The circuit 350 has a first capacitor 352 parallel to a first heating coil 354 and a second capacitor 356 parallel to the union of the first and second heating coils 354 and 358. The second heating coil is provided above the first heating coil in the present embodiment, i.e., the second heating coil 358 is closer to the positive rail than the first heating coil 354. A switch 360 is connected to a node common to the first capacitor 352, the second capacitor 356, and the first heating coil 354. A diode 362 is connected anti-parallel to the switch 360.

Some of the advantages of the circuit 301 includes the following. The circuit 301 has a lower peak and RMS current for the transistor at larger output power. This circuit can use less expensive transistors. The conduction loss and switching loss at the transistor is reduced.

Figure 8:
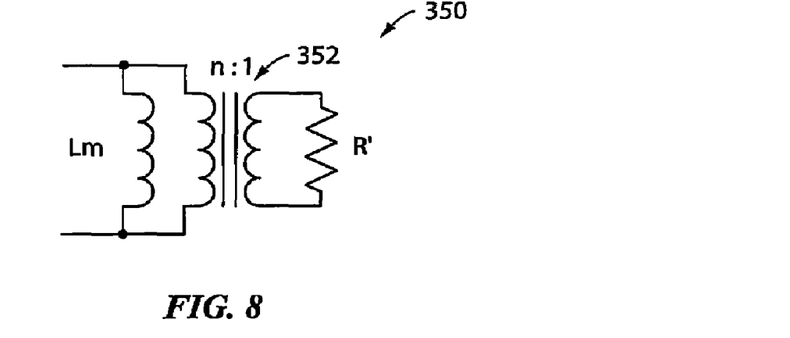
FIG. 8 illustrates an equivalent circuit for the heating coil and the metal bowl of FIG. 6.
Figure 9:
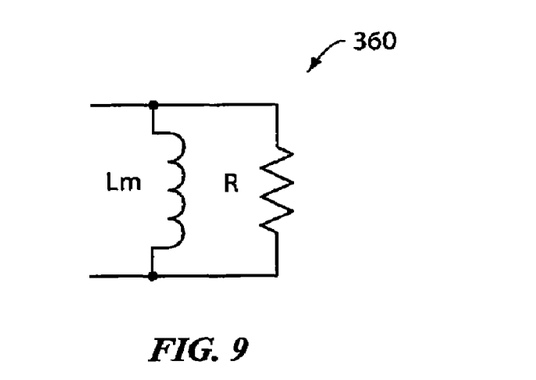
FIG. 9 illustrates a circuit illustrating a heating coil and a metal bowl.

FIG. 8 illustrates an equivalent circuit for the heating coil and the metal bowl of FIG. 6. $L_m$ represents the primary side magnetizing inductance. A transformer 352 is deemed to be an ideal n: 1 transformer having infinite magnetizing inductance. R' represents the resistance of the metal bowl. The resistance R' is seen as $R=n*n*R'$ at the primary side. Hence, the heating coil and the metal bowl can be treated a circuit 360 including an inductor $L_m$ and a resistor R in parallel, as shown in FIG. 9.

Figure 10:
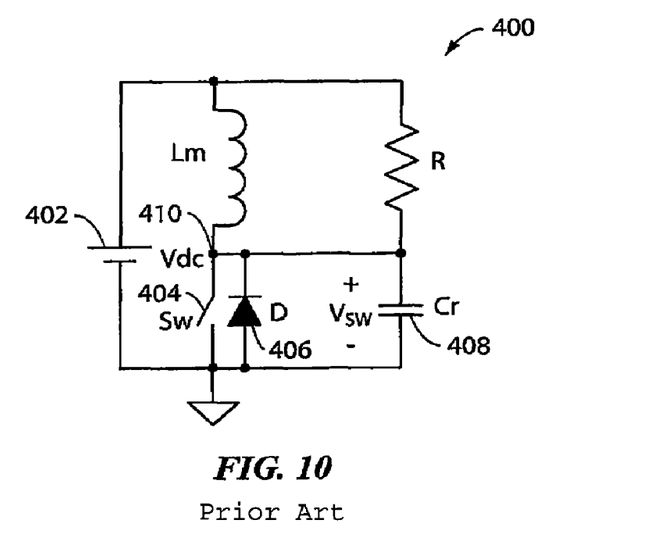
FIG. 10 illustrates a heating circuit according to conventional technology.

FIG. 10 illustrates a heating circuit 400 according conventional technology. The circuit 400 is a Class-E type circuit and includes a voltage source 402, an inductor $L_m$, a resistor R, a transistor 404, a diode 406, and a capacitor 408. The inductor Lm and the resistor R are in parallel between the voltage source 402 and a node 410. The transistor 404 and the capacitor 408 are in parallel between the node 410 and the ground. The capacitor 408 is a resonant component. The diode 406 may be a body diode of the transistor or a separate diode thereof.

Figure 11:
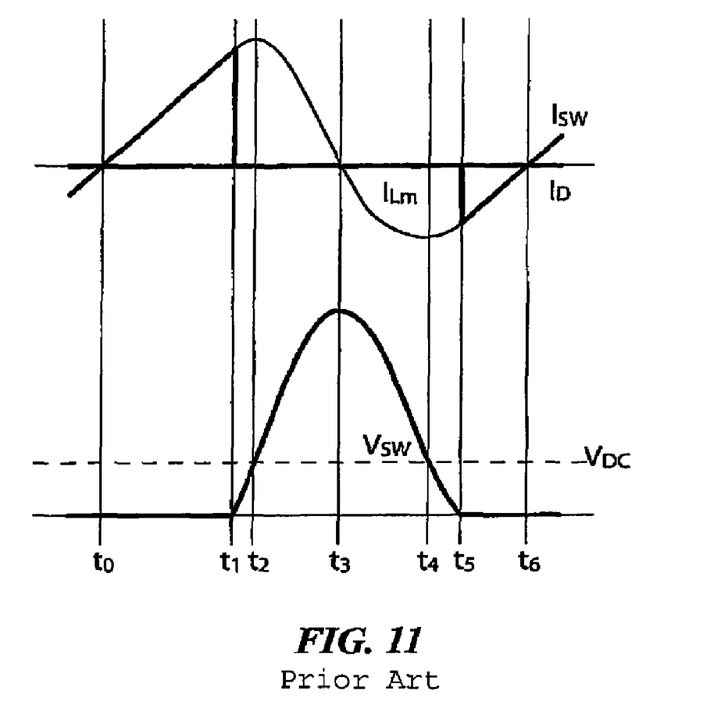
FIG. 11 illustrates operating waveforms of the circuit of FIG. 10.

In operation, the switch voltage $V_{SW}$ is not deep negative. The diode 410 prevents $V_{SW}$ from going deep negative. FIG. 11 illustrates operating waveforms of the circuit 400. The circuit is a Class-E converter type induction heat circuit. The average voltage of $V_{SW}$ is the same as $V_{DC}$ since the average voltage across the inductor Lm should be zero in steady state, repetitive operation. If the R is not too small, the switch can be turned-on while the diode is conducting current.

At t0, as inductor current $I_{Lm}$ becomes zero, the diode stops conducting. Between t0~t1, $I_{Lm}$ linearly increases with the slope of Vdc/Lm. At t1, the switch Sw is turned off. At t1~t2, $I_{Lm}$ increases and reaches maximum at t2. At t2~t3, $I_{Lm}$ decreases and reaches zero at t3. Between, t3~t4, $I_{Lm}$ decreases and reaches the negative peak at t4. Between t4~t5 $I_{Lm}$ increases. At t5, the voltage $V_{SW}$ becomes zero and the diode starts conducting inductor current. Between t5~t6, $I_{Lm}$ linearly increases with the slope of $V_{DC}/L_m$. At t6, the initial state t0 is reached.

The voltage $V_{DC}$-$V_{SW}$ is the output voltage, where $V_{DC}$ is deemed zero voltage. The output voltage is reduced by (1/n). A large current flows through the secondary side of the transformer (or heating coil), i.e., through the bowl. If the current is too large, the resonant circuit loses much of its energy and $V_{SW}$ does not return to zero at t5. Then, the switch cannot be turned on at zero voltage and would result in much switching loss.

Figure 12:
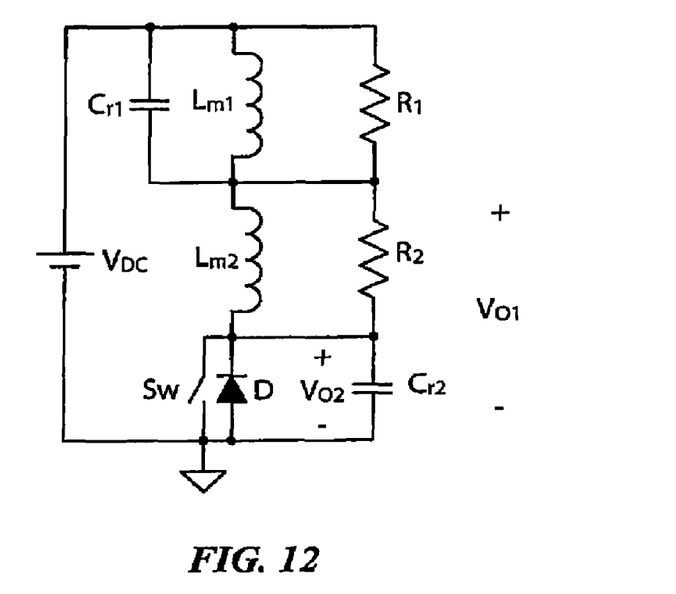
FIG. 12 illustrates a heating circuit according to one embodiment of the present invention.

FIG. 12 illustrates a heating circuit according to one embodiment of the present invention. The resonant circuit comprising $C_{r1}$ and $L_{m1}$ is oscillating at the same frequency of the switching of the switch Sw. The switch Sw is turned on when the voltage $V_{O2}$ across it becomes zero. It is turned off when the current across it starts decreasing. This switching method is one of many possible methods.

Figure 13:
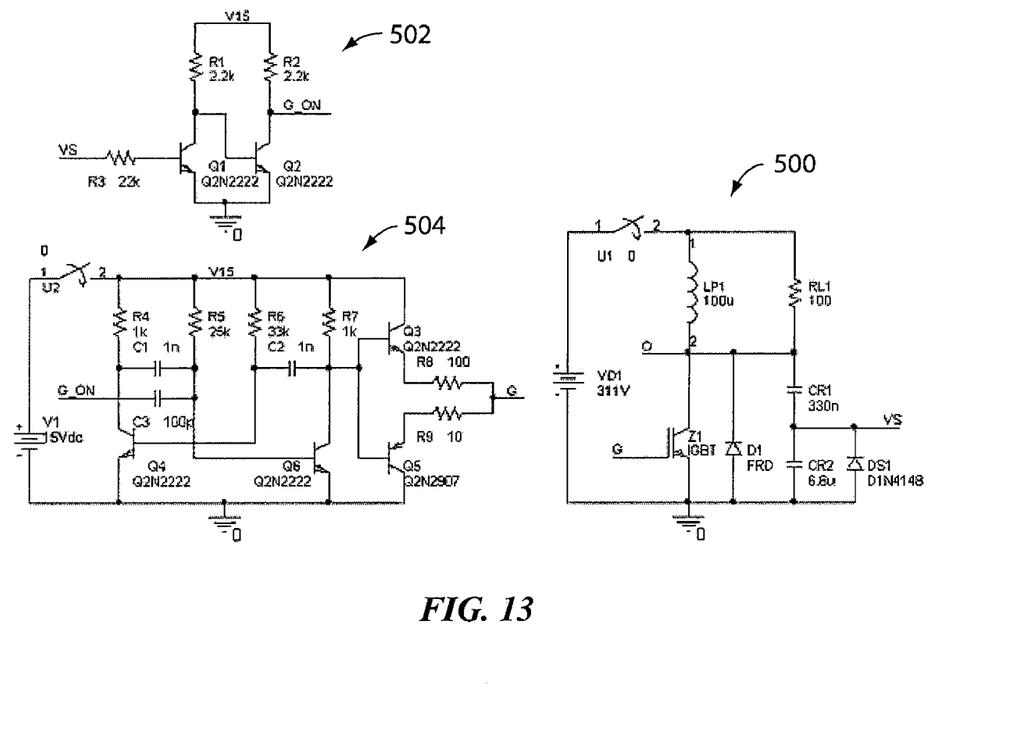
FIG. 13 illustrates circuits used to heat a rice cooker according a conventional technology.
Figure 14:
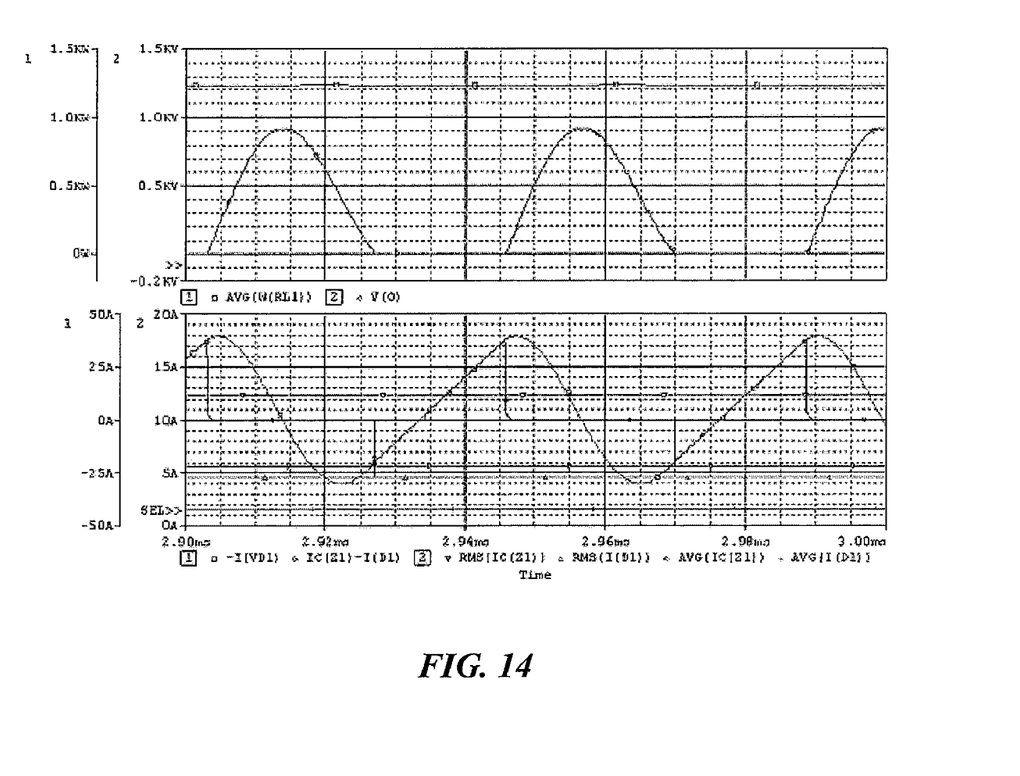
FIG. 14 illustrates waveforms of simulation for with the circuits FIG. 13.

FIG. 13 illustrates circuits used to heat a rice cooker according a conventional technology. A heating circuit 500 used to heat the metal bowl of the rice cooker and includes a switch Z1. The switch is an IGBT. A sensor 502 is used to send a signal G_ON when the output voltage goes to negative. A gate driver 504 outputs a control signal G that is used to turn on the switch Z1 according to the signal G_ON. The gate driver 504 may be configured to turn-on or turn-off periodically without any input from the sensor 502. FIG. 14 illustrates waveforms of simulation for with the circuits 500, 502, 504.

Figure 15:
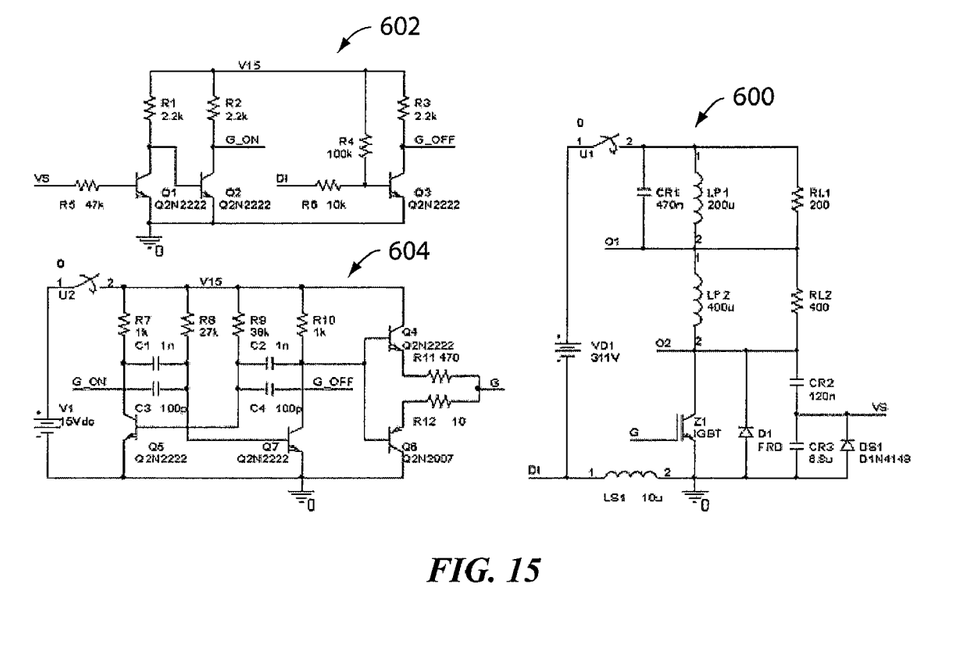
FIG. 15 illustrates circuits used to heat a rice cooker according to one embodiment of the present invention.
Figure 16:
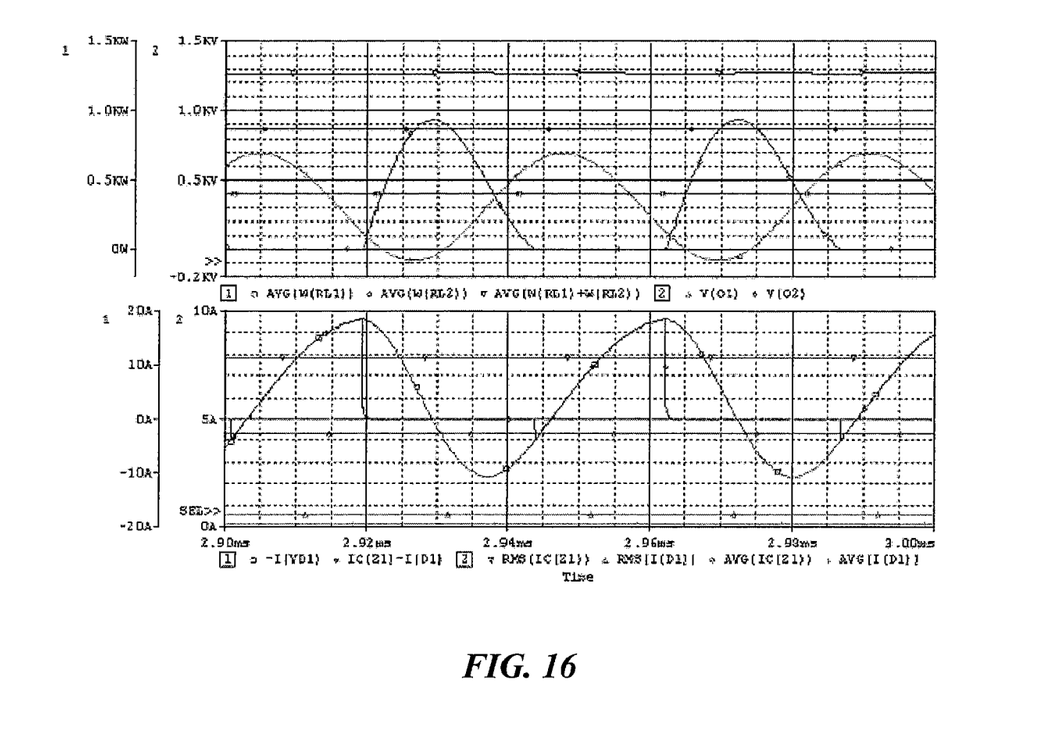
FIG. 16 waveforms of simulation for with the circuits of FIG. 15.

FIG. 15 illustrates circuits used to heat a rice cooker according to one embodiment of the present invention. A heating circuit 600 used to heat the metal bowl of the rice cooker. The circuit 600 includes a switch Z1 and an inductor $L_{S1}$. The switch Z1 is controlled by an input G. The inductor $L_{S1}$ is used to detect the derivative of the total current. A sensor 602 receives a signal D1 and determines whether or not the derivative of the switch current has a negative slope. A gate driver 604 outputs a control signal that is used to turn on the switch Z1 of the circuit 600 according to the signals received from the sensor 602. The gate driver 604 may be configured to turn-on or turn-off periodically without any input from the sensor 602. FIG. 16 illustrates waveforms of simulation for with the circuits 600, 602, 604.

Below are the results of the simulation on the circuits 500, 600. The parameters of the circuits were chosen to make output power and operating frequency similar to each other.

|  |  | First Circuits 500, 502, 504 | Second Circuits 600, 602, 604 |
|---|---|---|---|
| Frequency |  | 23 kHz | 23 kHz |
| Output power |  | 1.23 kW | 1.28 kW |
| Peak voltage of switch |  | 920 V | 930 V |
| Peak current | Switch | 38 A | 18.5 A |
|  | Diode | 19 A | 4.0 A |
| RMS current | Switch | 12.3 A | 7.9 A |
|  | Diode | 4.5 A | 0.6 A |
| Average current | Switch | 5.8 A | 4.3 A |
|  | Diode | 1.5 A | 0.1 A |

The switching power loss is nearly proportional to the peak currents. The conduction loss for unipolar device is the product of (RMS current)$^2$ and on-resistance. The conduction loss for bipolar device is the product of average current and on-voltage. In both case of IGBT (Insulated Gate Bipolar Transistor) and anti-parallel diode, the conduction loss will be between these two conduction loss equations. The following table compares the power losses.

|  |  | First Circuits 500, 502, 504 | Second Circuits 600, 602, 604 | Reduction Ratio |
|---|---|---|---|---|
| Switching Loss | Switch, A * Pz | 38 | 18.5 | 45% |
|  | Diode, A * Pd | 19 | 4.0 | 21% |
| Conduction Loss A (unipolar) | Switch, A * A * Ronz | 151 | 62 | 41% |
|  | Diode, A * A* Rond | 20 | 0.36 | 2% |
| Conduction Loss B (bipolar) | Switch, A * Vonz | 5.8 | 4.3 | 74% |
|  | Diode, A * Vond | 15 | 0.1 | 1% |

In the above, Pz is switching loss per peak current for the switch; Pd is switching loss per peak current for the diode; Ronz, is on-resistance for the switch; Rond is on-resistance for the diode; Vonz is on-voltage for the switch; Vond is on-voltage for the diode.

The present invention has been described in terms of specific embodiments. As will be apparent to those skilled in the art, various changes and modifications may be made without departing from the spirit and scope of the invention. For example, the heating circuit has been described in the context of a rice cooker but is not limited to such a device. The scope of the invention should be interpreted using the appended claims.

What is claimed is:

1. A heating circuit, comprising:
   a first heating coil provided adjacent to an object to be heated;
   a first capacitor provided in parallel to the first heating coil, the first capacitor and the first heating coil defining a first resonant circuit;
   a second heating coil having a first end and a second end, the first end of the second heating coil being coupled to the first heating coil and the first capacitor; and
   a second capacitor coupled to the second end of the second heating coil, wherein the second capacitor and the second heating coil are not coupled in parallel, the second capacitor and the second heating coil defining a second resonant circuit.

2. The circuit of claim 1, further comprising:
   a switch coupled to the second heating coil, wherein the first heating coil and the second heating coil are serially coupled and the second capacitor is provided in parallel to the serially coupled first and second heating coils.

3. The circuit of claim 2, wherein the switch is an IGBT or BJT.

4. The circuit of claim 1, wherein the circuit is configured to inductively heat a cooker having a conductive bowl, the object to be heated is the conductive bowl.

5. The circuit of claim 4, wherein the first heating coil is provided below the conductive bowl, wherein the circuit further comprises a diode that is anti-parallel to the switch.

6. The heating circuit of claim 4, wherein the second heating coil is provided around the conductive bowl.

7. The circuit of claim 6, further comprising:
   a switch coupled to the second heating coil, wherein the first heating coil and the second heating coil are serially coupled and the second capacitor is provided in parallel to the serially coupled first and second heating coils.

8. The circuit of claim 7, wherein the switch is an IGBT or BJT.

9. The circuit of claim 7, further comprising a diode provided anti-parallel to the switch.

10. The circuit of claim 7, wherein first and second heating coils are adjacent to each other.

11. The circuit of claim 7, wherein the heating circuit is coupled to a sensor to detect if a current slope goes negative and a gate driver configured to output a control signal to turn on or off the switch.

12. An induction heating circuit, comprising:
a first heating coil provided below a conductive bowl to heat the conductive bowl;
a first capacitor in parallel with the first heating coil, the first capacitor and the first heating coil defining a first resonant circuit;
a second heating coil provided around a body of the conductive bowl, wherein the first heating coil and the second heating coil are coupled in series; and
a second capacitor provided in parallel to the serially connected first and second heating coils, the second capacitor and the second heating coil defining a second resonant circuit.

13. The circuit of claim 12, further comprising:
first, second, and third nodes, wherein the first capacitor and the first heating coil are provided between the first and second nodes,
wherein the second heating coil is provided between the second and third nodes.

14. The circuit of claim 13, wherein the second capacitor has an end connected to the first node and another end connected to the third node.

* * * * *